US008150167B2

(12) United States Patent
Diggins

(10) Patent No.: US 8,150,167 B2
(45) Date of Patent: Apr. 3, 2012

(54) METHOD OF IMAGE ANALYSIS OF AN IMAGE IN A SEQUENCE OF IMAGES TO DETERMINE A CROSS-FADE MEASURE

(75) Inventor: Jonathan Diggins, Eastleigh (GB)

(73) Assignee: Snell Limited, Hampshire (GB)

(*) Notice: Subject to any disclaimer, the term of this patent is extended or adjusted under 35 U.S.C. 154(b) by 913 days.

(21) Appl. No.: 12/162,911

(22) PCT Filed: Feb. 5, 2007

(86) PCT No.: PCT/GB2007/000378
§ 371 (c)(1),
(2), (4) Date: Jul. 31, 2008

(87) PCT Pub. No.: WO2007/088389
PCT Pub. Date: Aug. 9, 2007

(65) Prior Publication Data
US 2009/0034876 A1 Feb. 5, 2009

(30) Foreign Application Priority Data

Feb. 3, 2006 (GB) .................................. 0602213.1

(51) Int. Cl.
*G06K 9/64* (2006.01)
*G06K 9/00* (2006.01)
*H04N 9/64* (2006.01)
(52) U.S. Cl. ......... 382/218; 382/107; 382/286; 348/700
(58) Field of Classification Search .................. 382/218, 382/107, 286, 173; 348/19, 700; 375/240.01, 375/240.14
See application file for complete search history.

(56) References Cited

U.S. PATENT DOCUMENTS 5,283,645 A * 2/1994 Alattar ..................... 375/240.01
(Continued)

FOREIGN PATENT DOCUMENTS

EP 0 659 016 6/1995
(Continued)

OTHER PUBLICATIONS

Smith, M. et al., "Unsupervised Object-based Detection of Dissolves in Video Sequences", IEEE Southwest Symposium on Image Analysis and Interpretation, No. 6th Edition, Mar. 28, 2004, pp. 31-35.
Su, C.W. et al., "A motion-tolerant dissolve detection algorithm", Multimedia and Expo, 2002, IEEE International Conference on Lausanne, Switzerland, vol. 2, Aug. 26, 2002, pp. 225-228.

(Continued)

*Primary Examiner* — Brian Q Le
*Assistant Examiner* — Ha Le
(74) *Attorney, Agent, or Firm* — Pearl Cohen Zedek Latzer, LLP

(57) ABSTRACT

The present invention relates to a method of and apparatus for image analysis and in particular may relate to the detection of cross-fades in film or video sequences. The invention relates in particular to a method of analysing an image of a sequence of images to determine a cross-fade measure based on determined temporal picture information transitions associated with picture elements of the image. In particular, the cross-fade measure may be determined based on the extent to which the temporal picture information transitions are uniform. The method and apparatus of the invention can provide a measure of likelihood of a cross-fade in a single pass. In addition the described method can be accomplished in real-time or close to real-time. In addition the cross-fade detection results are comparable with, or better than, the results achieved by the prior art methods.

17 Claims, 14 Drawing Sheets

U.S. PATENT DOCUMENTS

| | | | |
|---|---|---|---|
| 5,500,689 A | | 3/1996 | Lam |
| 5,732,146 A | * | 3/1998 | Yamada et al. ............... 382/107 |
| 5,767,922 A | | 6/1998 | Zabih et al. |
| 6,459,459 B1 | * | 10/2002 | Ratakonda .................... 348/700 |
| 6,721,361 B1 | * | 4/2004 | Covell et al. ............. 375/240.14 |
| 6,748,114 B1 | | 6/2004 | Ishikawa |
| 2001/0003468 A1 | | 6/2001 | Hampapur et al. |
| 2001/0005430 A1 | * | 6/2001 | Warnick et al. ............... 382/173 |
| 2002/0126224 A1 | * | 9/2002 | Lienhart ....................... 348/700 |
| 2005/0078223 A1 | | 4/2005 | Liu et al. |
| 2006/0197879 A1 | * | 9/2006 | Covell et al. ................. 348/700 |

FOREIGN PATENT DOCUMENTS

| | | |
|---|---|---|
| EP | 0 710 031 | 5/1996 |
| EP | 0 896 466 | 2/1999 |
| EP | 1 037 469 | 9/2000 |

OTHER PUBLICATIONS

Zhang, Hongjiang, et al., "Automatic Partitioning of Full-motion Video", Multimedia Systems, vol. 1, No. 1, Jan. 1993, pp. 10-28.

Otsuji, K. et al., "Video Browsing Using Brightness Data", Proceedings of The SPIE, vol. 1606, Nov. 11, 1991, pp. 980-989.

Boreczky, J.S. et al., "Comparison of Video Shot Boundary Detection Techniques" Journal of Electronic Imaging, vol. 5, No. 2, Apr. 1996, pp. 122-127.

Lienhart, Rainer, "Reliable Transition Detection in Videos: A Survey and Practitioner's Guide", International Journal of Image and Graphics, vol. 1, No. 3, Jul. 2001, pp. 469-486.

International Search Report for International Application No. PCT/GB2007/000378, Oct. 5, 2007.

* cited by examiner

Fig 13/14

METHOD OF IMAGE ANALYSIS OF AN IMAGE IN A SEQUENCE OF IMAGES TO DETERMINE A CROSS-FADE MEASURE

CROSS-REFERENCE TO RELATED APPLICATIONS

This application is a National Phase Application of PCT International Application No. PCT/GB2007/000378, International Filing Date Feb. 5, 2007, which claimed priority from Great Britain Patent Application No. 0602213.1, filed Feb. 3, 2006, which is hereby incorporated by reference.

FIELD OF THE INVENTION

The present invention relates to a method of and apparatus for image analysis and in particular may relate to the detection of cross-fades in film or video sequences.

BACKGROUND OF THE INVENTION

Cross-fade is a general term for the situation where moving images in film or video sequences dissolve gradually between one scene and another. Cross-fades are a common video editing effect and typically are used to create a softer transition between scenes than a cut.

FIG. 1 illustrates an exemplary cross-fade over 5 images between a first image sequence, or scene, A and a second image sequence, or scene, B. Typically a cross-fade will occur over more than five images (four periods) in a sequence of images, and so FIG. 1 is intended to be merely illustrative of the principles involved in a cross-fade. In the first image of the cross-fade, image 1, the image from sequence A is contributing 100% of the picture information and the image from sequence B is contributing 0% of the picture information. As the cross-fade progresses, the proportion of the picture information contributed by the corresponding image from sequence B increases while the proportion of the picture information contributed by the corresponding image from sequence A decreases. Thus the middle image of the cross-fade, image 3, has an equal contribution from the corresponding images in sequences A and B. In the last image of the cross-fade, image 5, the image from sequence A is contributing 0% of the picture information and the image from sequence B is contributing 100% of the picture information. Clearly, there may be motion in either or both of the first or the second image sequence during a cross-fade, but the principle of variable contributions from each of the first and second image sequences remains.

A special case of cross-fades occurs when either the original or the target scene is a solid colour, typically black. These special cases are sometimes called fade-in and fade-out.

Increasingly it is desirable to analyse image sequences in order to detect cross-fades.

One method previously proposed in "Feature-based algorithms for Detecting and Classifying Scene Breaks" Ramin Zabih, Justin Miller and Kevin Mai. ACM Journal of multimedia systems 7(2) pp 119-128 March 1999, relies on searching a sequence of images for appearing and disappearing edges or lines, in order to detect cross-fades.

"Analysis-by-synthesis Dissolve Detection" Michele Covell, S. Ahmad. IEEE International Conference on Image Processing, Rochester N.Y. September 2002 discloses an alternative technique in which a "synthesis" dissolve is carried out between a previous image and the current image in a sequence and the result compared with intervening images in the sequence to determine whether a cross-fade has taken place.

A combination of these ideas is presented in "Reliable Dissolve Detection" Rainer Leinhart, Storage and retrieval for Media Databases 2001, Proc. SPIE 4315, pp 219-230, January 2001.

These prior art techniques involve considerable processing with multiple passes through the video data and are only suitable for off-line applications. In addition, the detection rates are generally poor.

SUMMARY OF INVENTION

The present invention seeks to provide an improved method of and apparatus for image analysis that facilitates cross-fade detection. In one aspect, the present invention seeks to provide a method of and apparatus for cross-fade detection in a single pass in real-time hardware or close to real-time in software. Clearly, in the future it is expected that improvements in computer power will result in real-time operation in software.

In accordance with a first aspect of the invention there is provided a method of image analysis of images in a sequence of images, comprising the steps of: for a plurality of picture information picture elements representing an image, determining a temporal transition in picture information associated with each picture element; and using temporal picture information transitions associated with picture elements to determine a cross-fade measure.

In accordance with a second aspect of the invention there is provided an apparatus for analysing images in a sequence of images, comprising: means for determining a temporal transition in picture information associated with each picture element for a plurality of picture information picture elements representing the image; and means for determining a cross-fade measure using temporal picture information transitions associated with picture elements.

BRIEF DESCRIPTION OF THE DRAWINGS

For a better understanding of the present invention, and to show how it may be brought into effect, reference will now be made, by way of example, to the accompanying drawings, in which.

DETAILED DESCRIPTION OF THE INVENTION

The method is based on an analysis of temporal transitions in picture information associated with picture elements of an image, which temporal transitions are derived from picture information for corresponding picture elements from near or adjacent images in a sequence of images. The cross-fade measure in one aspect is related to the degree to which temporal picture information transitions are substantially or generally uniform.

In the description, the terms "generally uniform picture information transition" or "substantially uniform picture information transition" are intended to encompass linear or substantially linear temporal picture information transitions. Clearly, exact linearity is not required. The degree of linearity that is required to enable cross-fading images to be distinguished from non-cross-fading images with acceptable accuracy can be determined empirically and by optimisation.

In the exemplary embodiment luminance information is used as picture information. However the picture information may alternatively or additionally be chrominance or other picture information, such as texture information, for example.

In the description the term "image" is used to refer to either an interlaced field or a progressive frame of picture information, typically luminance information as indicated above.

In the description the term "picture element" is used to refer to an individual portion of the picture, having picture information associated therewith that is representative of the image at a specific spatial location within the image. The term "picture element" may refer to the input pixels of an image or may instead refer to filtered and/or sub-sampled values.

Figure 1:
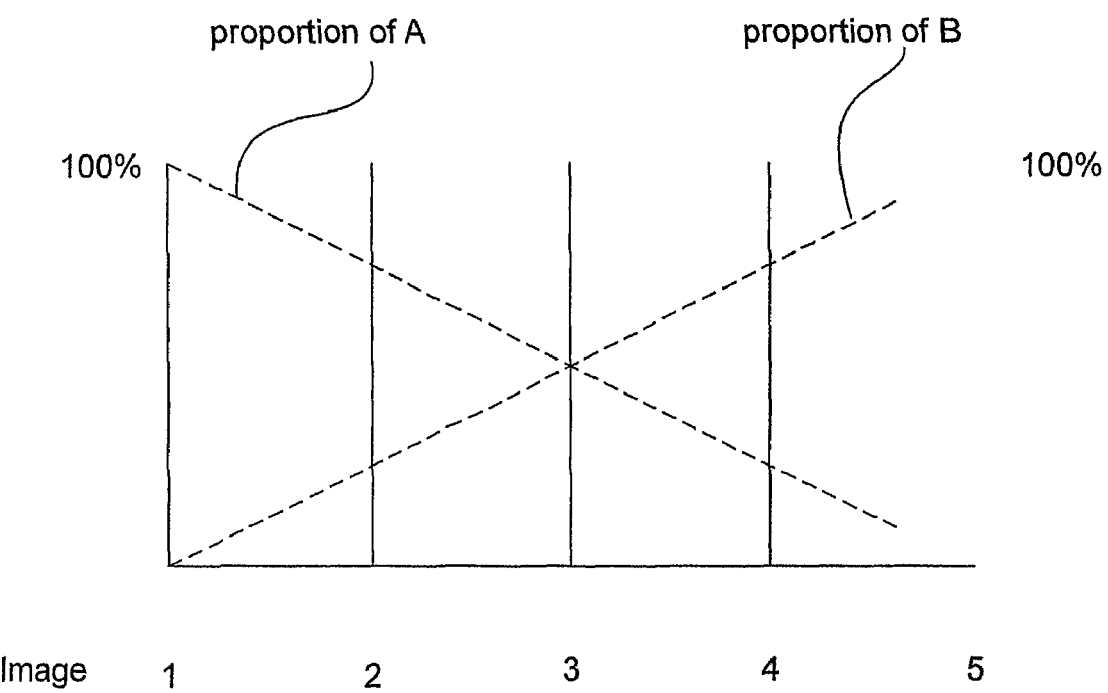
FIG. 1 illustrates a cross-fade over 5 images.
Figure 2:
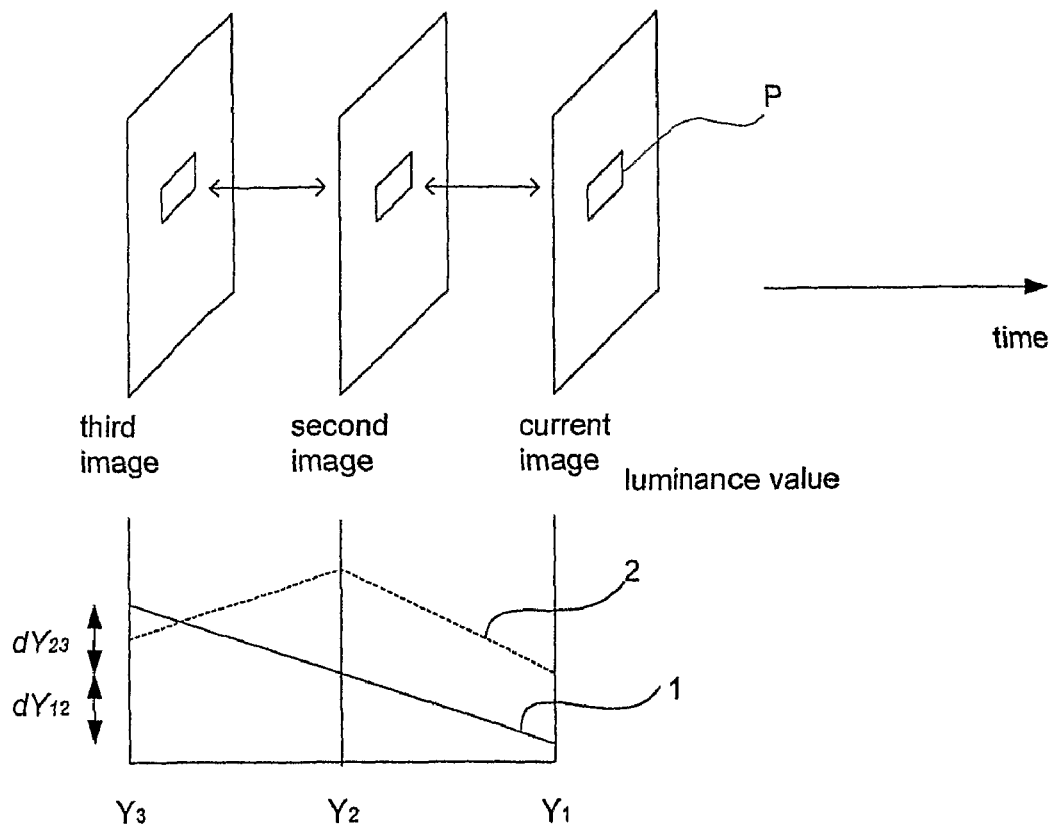
FIG. 2 shows three images in a sequence of images.

The basis of this novel approach to detection of cross-fades is explained with reference to FIG. 2. FIG. 2 shows three images in a sequence of images, a current image and a second image and third image preceding the current image in the sequence.

A picture element P in the current image has a picture information value $Y_1$, and the corresponding picture elements in the second image and the third image have picture information values $Y_1$ and $Y_3$ respectively. As indicated above, the picture information values may be luminance values For reasons that will be explained later, the three images are not necessarily adjacent in the sequence: however the three images will be sufficiently close to each other in the sequence that a cross-fade might include all three images. Two exemplary sequences 1 and 2 of the picture information values of corresponding picture elements in each image are plotted beneath the images.

The present invention is based on the realisation by the inventor that a cross-fade is more likely to be occurring when regions of the image undergo a generally uniform temporal picture information transition, such as the linear temporal picture information change shown in sequence 1. In contrast, the picture information change shown in sequence 2 is unlikely to result from a cross-fade including these three images.

Thus a measure of the likelihood that a cross-fade, which includes a particular image, is occurring can be established dependent on an evaluation of temporal picture information transitions of picture elements of that image.

Figure 3:
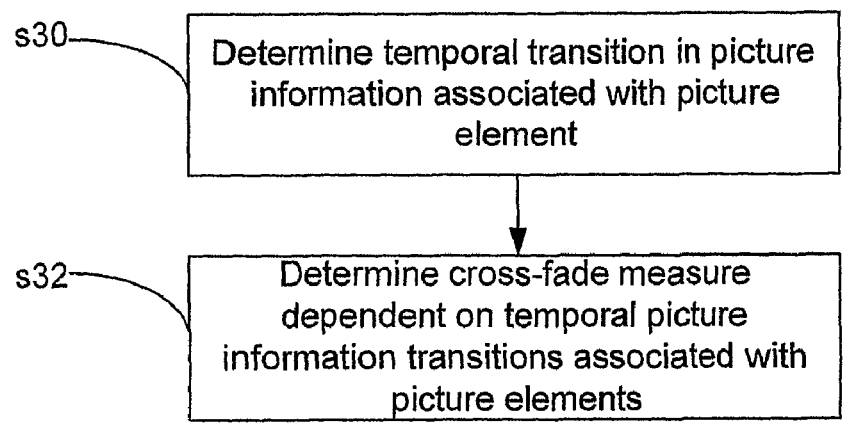
FIG. 3 illustrates a conceptual understanding of the evaluation of a cross-fade measure.

FIG. 3 illustrates this conceptual understanding of the evaluation of a cross-fade measure. In step s30, temporal transitions in picture information associated with picture elements of an image are determined. In step s32, a cross-fade measure is determined dependant on temporal picture information transitions associated with picture elements.

In one embodiment, the cross-fade measure is determined dependant on the uniformity of temporal picture information transitions. A generally uniform temporal picture information transition for a picture element may be determined by establishing two picture information gradients associated with the picture element, and comparing these picture information gradients. A generally uniform picture transition for a picture element may be determined when the two picture information gradients are similar i.e. the difference between the two picture information gradients is small. In one embodiment the picture information gradients are established by taking the difference between picture information of corresponding picture elements in nearby images. The picture information gradients are compared in one embodiment by taking the difference between the picture information gradients. Clearly in this embodiment, the smaller the difference between the picture information gradients, the more linear, or generally uniform, is the picture information transition of that picture element.

In embodiments of the invention further information may be determined and may additionally be used alone or in combination in establishing a cross-fade measure. The use of this additional information may increase the probability that detected picture information transitions are genuinely as a result of a cross-fade, as opposed to being a natural feature of the image sequence.

The likelihood that a transition in picture information associated with a picture element of an image in an image sequence has arisen as a result of a cross fade generally increases with an increase in the gradient of the detected transition. In embodiments of the invention where the gradient is determined by taking the difference between picture information of the picture element and picture information of a corresponding picture element in another image of the sequence, the likelihood that a cross-fade is occurring will increase with an increase in the magnitude of the difference.

If a picture element that is undergoing a generally uniform picture information transition is in a region of neighbouring picture elements in which the picture information is relatively homogenous, the likelihood that the generally uniform transition arises as a result of a cross-fade is increased.

Moreover, if a picture element that is undergoing a generally uniform picture information transition is in a region of neighbouring picture elements that are also undergoing a similar generally uniform picture information transition, the likelihood that the generally uniform transition arises as a result of a cross-fade is increased.

Moreover, if a picture element is undergoing a generally uniform transition is in a relatively homogenous picture information region in successive images, and/or is in a region of generally uniform picture information transition in successive images, the likelihood that the generally uniform transition arises as a result of a cross-fade is increased.

The likelihood that a cross-fade is occurring is increased if generally uniform transitions in picture information are detected for a large number of picture elements, as opposed to for only a small number of picture elements. In addition, the likelihood that a cross-fade is occurring is increased if the picture elements undergoing a detected generally uniform transition are dispersed across the image compared with a situation in which all the picture elements undergoing a generally uniform transition are concentrated in a small area of the image.

The method of an exemplary embodiment of the invention will now be described with reference to the flow chart of FIG. 4. The exemplary embodiment uses luminance information as the picture information, although as indicated previously other embodiments may use other types of picture information.

In the exemplary embodiment, the additional factors mentioned above are determined and used, in addition to information relating to picture information transitions associated with the picture element, in generating a measure of the likelihood of a cross-fade. However, it will be clear to a skilled person that the additional factors may be omitted or included in any combination or sub-combination in alternative embodiments. Furthermore, the method of determination of the factors may be carried out in alternative ways and is not limited to the methods described herein. In addition, it will be apparent that the order of steps in FIG. 4 is not essential, and selected steps of the method may be carried out in alternative orders in accordance with embodiments of the invention.

Figure 4:
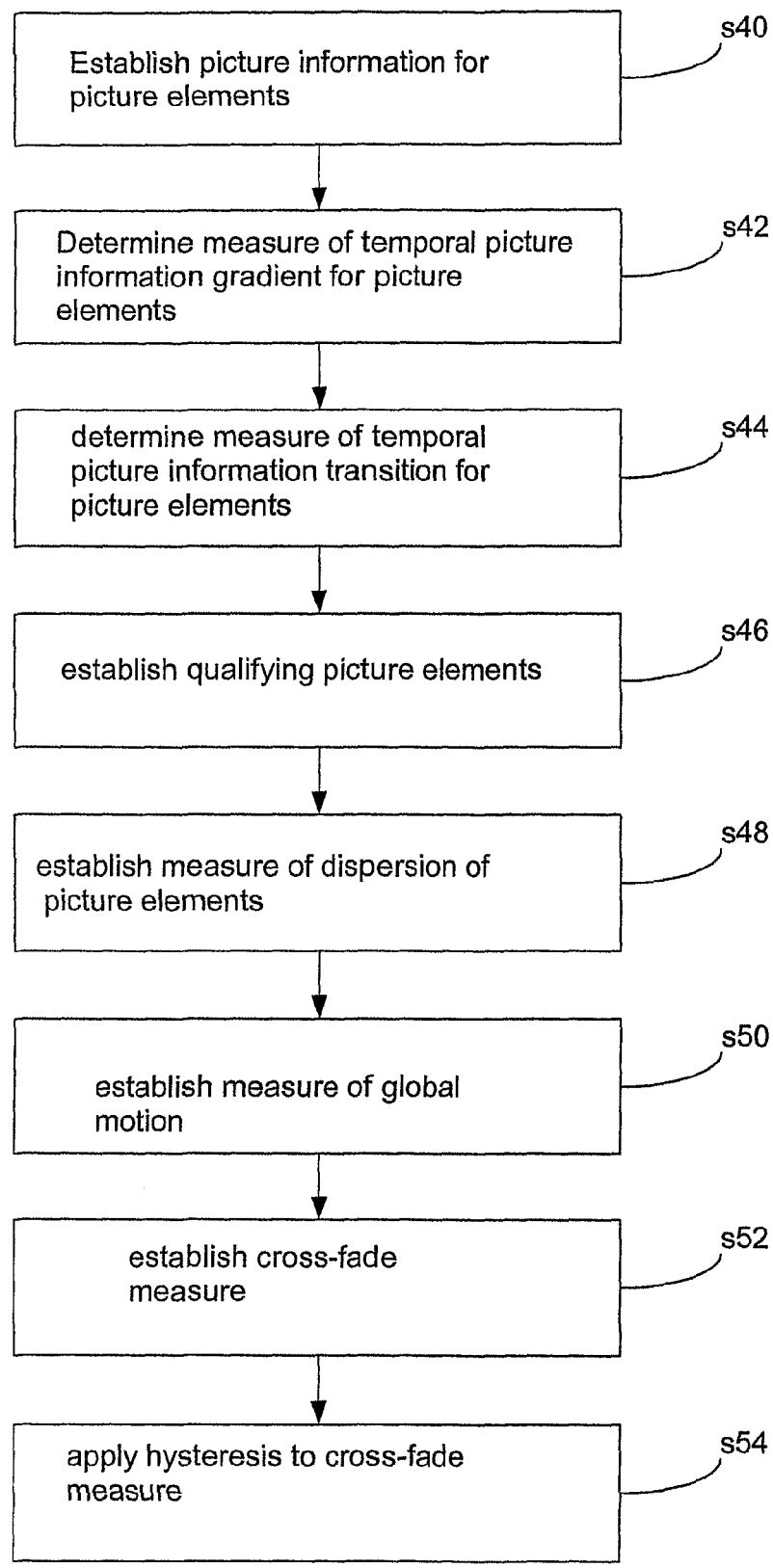
FIG. 4 is a flow chart of the method of an exemplary embodiment.

Firstly, in step s40 in FIG. 4, for each image in a sequence of images, picture information, in this case luminance information, is established for a plurality of picture elements. The picture information may be stored in some embodiments in the form of an array, corresponding to an array of the picture elements representing the image, or may be stored in other embodiments as a sequential block of memory that is conceptually viewed, and can be accessed, as an array. As will be apparent to a skilled person, the picture information may be stored in a number of alternative arrangements.

Input picture information may be low pass filtered and sub-sampled horizontally and vertically to generate an array of picture elements having picture information, in this case luminance values, representative of the image. The sub-sampling produces a smaller number of picture elements than there were pixels in the input image.

This reduction in the number of picture elements does not significantly impair the accuracy of the cross-fade discrimination, but does lead to a reduction in the amount of processing required to analyse the images. In practice, sub-sampling a standard definition interlaced video field by a factor of four both horizontally and vertically, to give an array of 72 lines by 180 picture elements, has been found acceptable.

The information used to discriminate cross-fades is generally low frequency information and so a low pass spatial filtering step may improve the accuracy or reliability of the cross-fade discrimination by reducing the effect of high frequency detail on the cross-fade discrimination.

Although the input pixel values are filtered and sub-sampled to generate an array of picture elements in the exemplary embodiment described above, it will be apparent to a skilled person that in other embodiments input picture information may be used directly, if desired, without filtering. In addition, as will be apparent to a skilled person, in alternate embodiments, low pass filtered but not sub-sampled image picture information may be used.

Finally, interlaced fields may be aligned to co-site picture elements from adjacent fields, in order to facilitate comparisons between fields.

In step s42 of FIG. 4 a measure of the temporal picture information gradient (dY), or change in picture information between images, associated with each of the picture elements is established. In the exemplary embodiment, the luminance gradient (dY) is determined from the difference in luminance values between the picture element and a corresponding picture element in another image.

In step s44 of FIG. 4, for each of the picture elements, a measure of the temporal picture information transition $\Delta dY$, or change in temporal picture information gradient, is determined. In the exemplary embodiment a comparison is made between two temporal luminance gradient values associated with the picture element. In the exemplary embodiment this is achieved by measuring the change of luminance gradient $\Delta dY$ associated with each of the picture elements of the array. In the exemplary embodiment, the change of luminance gradient $\Delta dY$ is established by taking the difference between a first and a second luminance gradient value associated with the picture element.

In the exemplary embodiment, the first and second luminance gradient values associated with an element of the array are calculated from luminance values of corresponding elements in at least a second and a third image of the sequence. This will now be explained in more detail with reference to sequence 1 in FIG. 2.

Referring now to FIG. 2, for each picture element P, the difference $dY_{12}$ between the luminance value $Y_1$ of the picture element P in the current image and the luminance value $Y_2$ of the corresponding picture element in the second image is determined, so that $dY_{12}=Y_1-Y_2$. In addition the difference $dY_{23}$ between the luminance value $Y_2$ of the corresponding picture element in the second image and the luminance value $Y_3$ of the corresponding picture element in the third image is determined, so that $dY_{23}=Y_2-Y_3$.

In the exemplary embodiment, the measure of the luminance gradient dY for picture element P of the current image is determined in step s42 as the difference between the luminance value $Y_1$ of the picture element P in the current image and the luminance value $Y_2$ of the corresponding picture element in the second image. Thus the measure of the luminance gradient $dY=dY_{12}$.

In the exemplary embodiment the measure of the change of luminance gradient $\Delta dY$ is determined in step s44 to be the difference between difference $dY_{12}$ and difference $dY_{23}$. Thus the measure of the change of luminance gradient $\Delta dY=dY_{12}-dY_{23}$.

Clearly, in alternate embodiments luminance gradient dY can be determined in different ways. For example, in the above embodiment, the difference between the luminance values of corresponding picture elements in two images is taken as a measure of luminance gradient without taking into account the temporal distance between the images. In some embodiments, the temporal distance may be taken into account, for example by dividing the absolute difference by the separation between the images.

At least two luminance gradients associated with a picture element are needed to determine the change of luminance gradient $\Delta dY$ in step s44. In the exemplary embodiment the two luminance difference values or gradients, $dY_{12}$ and $dY_{23}$ are used to establish the change in luminance gradient. The first luminance gradient $dY_{12}$ is determined by taking the difference between the luminance values of corresponding picture elements in the current image and second image $dY_{12}$. The second luminance gradient $dY_{23}$ is determined by taking the difference between the luminance values of corresponding picture elements in the second image and third image $dY_{23}$. However, the luminance gradients may be determined in other ways and in particular the two luminance gradients associated with a picture element may both be determined between the current image and a respective different image.

In accordance with the exemplary embodiment the luminance value Y, the luminance gradient dY and the change of luminance gradient $\Delta dY$, are stored for each picture element of the current image. In some embodiments of the invention three separate tables or arrays are formed, one for each of the luminance value Y, the luminance gradient dY and the change of luminance gradient ΔdY. In other embodiments, a single table or array including the luminance value Y, the luminance gradient dY and the change of luminance gradient ΔdY may be used.

The selection of the second and third image of the sequence for use in steps s42 and s44 of the exemplary method shown in FIG. 4 is by no means straightforward owing to the requirement to handle film-originating material or mixed cadence video material as will be explained in more detail below.

Video-originating material is relatively easy to handle, as each successive image of the image sequence (typically a sequence of interlaced fields at 50 or 60 fields per second) is captured at a different point in time. As a result, a cross-fade using this material will be reproduced faithfully as a smooth transition of luminance values in the successive images. However in film-originating material, a sequence of interlaced video fields at 50 or 60 fields per second is generated from the original film at 24 frames per second by generating odd- and even-line interlaced fields from the film frames. Thus a cross-fade in the film domain (at 24 frames per second) will not be faithfully reproduced in the resulting interlaced video fields at 50 or 60 fields per second.

In accordance with the exemplary method, the differences in luminance values between a picture element in the current image and the corresponding picture element in the images one, two and three images ago are measured and the image having the greatest difference measurement is selected as the second image. The difference in luminance values between the picture element in the current image and the corresponding picture element in the selected second image is recorded as luminance difference or gradient information dY for the picture element of the current image.

A search is then performed with respect to the selected second image to determine the maximum difference in luminance values between the picture element in the second image and the corresponding picture element in the image one, two and three images prior to the second image. The maximum difference found is treated as a second luminance difference or gradient measurement associated with the original picture element.

A measure of the change of luminance gradient ΔdY can be obtained by taking the difference between the luminance gradient dY and the second difference measurement. This change of luminance gradient ΔdY is also recorded for the picture element.

The above described process is carried out for all picture elements of the current image, and results in the determination of luminance gradient dY and change in luminance gradient ΔdY for each picture element.

Figure 5:
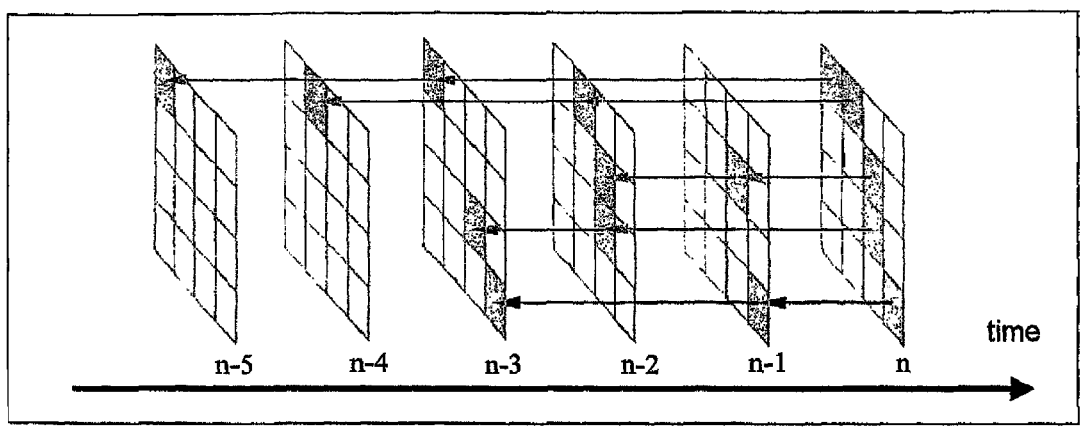
FIG. 5 shows second and third images used in determining luminance gradient and change in luminance gradient measures for different picture elements of an image.

In the above described embodiment it is important to note that because the maximum difference values are found for each picture element independently, the second and third images used to determine the difference values are not necessarily the same for all picture elements of the array. FIG. 5 shows second and third images used in determining luminance gradient and change in luminance gradient measures for different picture elements of an image. In FIG. 5 it is clear that the picture elements of the current image n reference the second and third images independently of each other. This approach enables the maximum luminance differences for each pixel to be determined individually, and this gives rise to a more robust method. In addition, this technique handles mixed cadence sources and images with captions or other synthetic picture information more robustly.

Alternative methods for identifying second and third images of the sequence for use in steps s42 and s44 may be used.

For example, a detector may be employed to establish the first field in film-originating material (following a 3:2 sequence) and then measurements for all picture elements can be taken using the images identified as first fields by the field detector. This approach enables a simple analysis, but if an error is made in identifying the first field, for example because of difficult mixed film/video sequences, decisions made on the resulting luminance gradient and change of luminance gradient data will be sub-optimum.

A slightly modified technique is to perform, for individual picture elements, a search over the adjacent and nearby images in order to identify adjacent or nearby images that have been derived from the same film frame, so that these images are not used in further analysis. Thus, for each picture element, a field difference value is calculated between the picture element and the corresponding picture element in three adjacent images in order to make a field pairing decision for the individual picture element. When a field difference value is small, the fields are likely to have been derived from the same film frame and these images are not used in further analysis.

Finally, a further technique is to search for the smallest rate of change of gradient associated with the picture element. One method of achieving this is to determine, using nine possible sampling arrangements of points A, B and C which are one, two, three image differences from the current image, and then one, two or three image displacements from each of those possibilities, the absolute rate of change of gradient, as $((A+C)/2-B)$, and dividing the absolute rate of change of gradient by the difference between end points A and C (providing it is non-zero) Abs(A-C).

Performing these searches over one, two and three fields ensures that a field from a different film frame is found even during the processing of the third field of a set of 3 fields derived from a single film frame in a 3:2 sequence.

As indicated above, the above described process is carried out for all picture elements of an image, and results in the determination of luminance gradient dY and change of luminance gradient ΔdY information for each picture element.

Next, in some embodiments picture elements that are more likely to enable discrimination of a cross-fading image sequence from a non-cross-fading image are selected as qualifying picture elements for further processing. Thus, returning to the flow chart of FIG. 4, in the exemplary embodiment in step s46 qualifying picture elements are established. This may be achieved for example by excluding from consideration picture elements that are not in homogenous luminance regions.

In order to determine whether a candidate picture element is a qualifying picture element, a local search may be performed over a local search area defined for each candidate picture element. The local search may determine the local variation in luminance values Y, i.e the difference between the maximum and minimum recorded luminance values Y for neighbouring picture elements in the image, and the local variation in luminance gradient values dY, i.e the difference between the maximum and minimum recorded in luminance gradient values dY for neighbouring picture elements in the image.

In the exemplary embodiment of the invention the local search is performed over a range κ of picture elements displaced horizontally and vertically each side of the candidate picture element, for example κ=3. This search appears sufficient to identify homogenous regions, although clearly other values of κ can be used as appears appropriate to a skilled person. In alternative embodiments it would be possible to perform the search using picture elements displaced only vertically, or picture elements displaced only horizontally with respect to the candidate picture element instead of using both horizontally-displaced and vertically-displaced picture elements as in the exemplary embodiment.

In the exemplary embodiment candidate picture elements are treated as qualifying picture elements when both the local variation in luminance values Y and the local variation in luminance gradient values dY are below a respective threshold. Thus, in an exemplary embodiment, the threshold for the variation in luminance values Y is 10 and the threshold for the variation in luminance gradient values dY is 30. Thus, in this exemplary embodiment, a picture element is counted as a qualifying picture element if:

$$\max(Y)-\min(Y) \leq T_Y \text{ and}$$

$$\max(dY)-\min(dY) \leq T_{dY}$$

where the max and min values are found within the local search range κ of picture elements, as described above. Typical values for the thresholds relative to standard 8-bit luminance values are: $T_Y=10$ and $T_{dY}=30$. The threshold values indicated above are exemplary and may be altered or optimised in alternative embodiments, as will be apparent to a skilled person.

These qualifying picture elements therefore are likely to be in regions that have both relatively homogenous luminance values, and also have relatively homogenous luminance gradient values.

In some embodiments a search to find a local variation in luminance values Y and a local variation in luminance gradient values dY is also carried out on a preceding image. In this case, the picture element is only considered to be a qualifying picture element if the local variation in luminance values Y and the local variation in luminance gradient values dY in both the current image and the preceding image are less than selected thresholds.

As mentioned above, it has been found that the more dispersed the qualifying picture elements are across the image, the more likely it is that a true cross-fade is in progress. In contrast, the more concentrated the qualifying picture elements are in a particular region, the more likely it is that the homogenous region qualification has been met because of a particular feature of the image sequence instead of because of a true cross-fade. Thus, in the exemplary embodiment, a measure of the dispersion of the qualifying picture elements across the image, $D_{disp}$, is determined next, in step s48.

In the exemplary embodiment, the dispersion of the qualifying picture elements within the image is measured by dividing the image into a number of regions and counting the number of regions that have at least one qualifying picture element falling within the region. In the exemplary embodiment, the image is divided into eight rows and eight columns, forming an 8×8 grid overlaid on the image. A grid box is counted in the dispersion count if one or more qualifying picture elements fall within the box. Thus the dispersion count measure $D_{disp}$ will have a value in the range between 1 (assuming at least one qualifying picture element is found) and 64 (assuming at least one qualifying picture element is found in each of the grid boxes).

As mentioned above, the presence of global motion, for example a pan or a tilt, in an image sequence can make cross-fade discrimination more difficult, since an image sequence including a pan, for example, may share many characteristics with a cross-fading sequence. Therefore in some embodiments a measure of global motion may be established. Thus, a measure of the global motion of the current image $D_{if}$ is determined in step s50 of the exemplary embodiment.

One way of determining a measure of global motion is to accumulate the absolute inter-field luminance difference between the current image and the immediately preceding image by measuring the absolute field difference relative to the previous image, for all picture elements. Alternatively, the field difference can be determined by accumulating, for all picture elements of the image, the magnitude of the difference dY between the luminance value $Y_1$ of the picture element of the current image and the luminance value $Y_2$ of the corresponding picture element of the second image. It should be noted as indicated previously that the second image is selected on a picture element by picture element basis and that a field difference measure determined by accumulating the determined picture information gradient dY is unlikely to represent the field difference between the current image and any previous image in its entirety. However, this relative inaccuracy may not be of significance. The accumulated difference value forms a measure of the global motion of the current image $D_{if}$.

Finally a cross-fade measure is established in step s52. In the exemplary embodiment the measure of likelihood of a cross-fade, or cross-fade measure, is established using all the information gathered as set out above. However it will be apparent to a skilled person that not all of the different types of information set out above must be determined and used in order to generate a useful measure of the likelihood of a cross-fade.

In fact, as indicated above, the measure of likelihood of a cross-fade is based on transitions in picture information for picture elements of an image. In particular the measure of likelihood of a cross-fade may be based on the degree to which transitions in picture information of picture elements are generally uniform. For example this may be determined by an analysis of the change in difference values between picture information of corresponding picture elements in nearby or adjacent images. The additional factors used in the exemplary embodiment may be used either alone or in any combination as supplementary factors in determining the measure of the likelihood of a cross-fade.

In the exemplary embodiment, the measure of the likelihood of a cross-fade is established in step s52 by the following steps.

Firstly, a ratio of temporal derivatives factor m is calculated for each qualifying picture element identified in step s46, the calculation being based on the picture information gradient dY, and the change in picture information gradient ΔdY determined for that picture element in steps s42 and s44 respectively as set out in expression 1.

$$m = \frac{a|dY|}{1+b|\Delta dY|} \tag{1}$$

where the factors of a and b are arbitrary, and can be selected by empirical methods and optimised, as will be discussed in more detail below; and the factor of 1 is added to prevent a possible division by zero.

The cumulative total $\Sigma_m$ for the image can be determined from the sum of the values of m determined for qualifying pixels in accordance with expression (1).

In addition a factor $\Sigma_n$ relating to the number of qualifying pixels may be used to normalise the value of $\Sigma_m$. Although in some embodiments of the invention the factor $\Sigma_n$ may be a simple count of the number of qualifying picture elements in the image, in the exemplary embodiment the count is "cored" so that, for each qualifying pixel, n is determined in accordance with expression 2

$$n = \begin{cases} m/C_T & \text{if } m < C_T \\ 1 & \text{otherwise} \end{cases} \quad (2)$$

where $C_T$ is a coefficient that can be determined by optimisation. A value of 10 for the coefficient $C_T$ has been found to give good results. The factor $\Sigma_n$ is then a cumulative total of n determined for all qualifying pixels in an image.

As will be apparent to a skilled person, the effect of the coring is to reduce the value of n when the value of m is small.

The average ratio of temporal derivatives factor m can then be determined by dividing the cumulative value $\Sigma_m$ by the cumulative value $\Sigma_n$. In the exemplary embodiment a coefficient $C_1$ is utilised as an additional term in the denominator as shown in expression 3.

$$\frac{\sum m}{c_1 + \sum n} \quad (3)$$

The use of this additional term $C_1$ in the denominator has the effect of reducing the average ratio when the number of qualifying picture elements is small.

In the exemplary embodiment, the average ratio is combined with the measure of the global motion of the current image $D_{if}$, as determined in step s50, and the measure of the dispersion of the qualifying picture information elements across the image $D_{disp}$, as determined in step s48, to form an expression x(t) representing a measure of likelihood of a cross-fade.

$$x(t) = \frac{\sum m}{c_1 + \sum n} + c_2 D_{if} + c_3 (64 - D_{disp}) \quad (4)$$

where the coefficients $C_2$ and $C_3$ may be determined by optimisation.

In some embodiments the measure of likelihood of a cross-fade x(t) may undergo further operations, such as filtering, as set out below Thus the measure of likelihood of a cross-fade x(t) may be low pass filtered with a first order infinite impulse response (IIR) smoother in order to smooth variations from image to image.

$$y(t) = y(t-1)\frac{F}{(F+1)} + x(t)\frac{1}{(F+1)} \quad (5)$$

where F=5 in an exemplary embodiment

Finally a measure M(t) can be established by combining y(t) from expression 5 with a delayed version of itself, multiplied by a coefficient $C_4$, and with a threshold coefficient $C_0$ $$M(t) = c_0 + y(t) + c_4 Y(t-T) \quad (6)$$

Again the coefficients $C_4$ and $C_0$ can be established by optimisation.

The measure M(t) obtained by expression (6) can be compared to a threshold value, for example 0, in order to determine whether a cross-fade is in progress. This can be indicated for example by the output of a cross-fade flag.

In order to minimise errors caused by transient fluctuations in the value of measure M(t) that are unrelated to a cross-fade in the underlying images, in the exemplary embodiment an additional step s54 is included in which hysteresis is applied to the measure M(t). Thus a cross-fade is not established until the measure M(t) for a number of consecutive frames $N_{on}$ indicates that a cross-fade is likely to be in progress. Similarly, the end of a cross-fade is not established until the measure M(t) for a number of consecutive frames $N_{off}$ indicates that a cross-fade is not likely to be in progress. The hysteresis can be provided by applying the measure of likelihood of a cross-fade M(t) to a state machine, as will be apparent to a skilled person.

Clearly, in some embodiments hysteresis may be applied directly to the measure of likelihood of a cross-fade x(t) itself, or another filtered version thereof.

The parameters identified in the exemplary embodiment outlined above may be chosen by optimisation. However, some of the parameters that may be optimised are used in pixel rate processing and are thus difficult to optimise using well known optimisation techniques such as downhill simplex or simulated annealing as discussed in "Numerical recipes in C" Cambridge University Press, 1995, Second Ed. In view of this, it has been found useful to generate header files with given pixel-rate parameters, and optimise the remaining field-rate parameters by simplex/annealing. However, other techniques for obtaining suitable parameters will be apparent to a skilled person.

In the exemplary embodiment, the pixel-rate parameters are the local search range κ, the coring value $C_T$, and the luminance and luminance difference range limits for qualifying pixels, ΔY and ΔdY respectively. The field-rate processing parameters are the coefficients $c_0 \ldots c_4$, the state machine set and reset thresholds $N_{on}$ and $N_{off}$, and the filter parameter and delay settings, F and T. These can be machine optimised by the usual iterative methods.

Moreover additional information, such as information from an analysis of an accompanying audio track, may also be used to supplement the method of the present invention in order to improve the accuracy of cross-fade detection.

Figure 6:
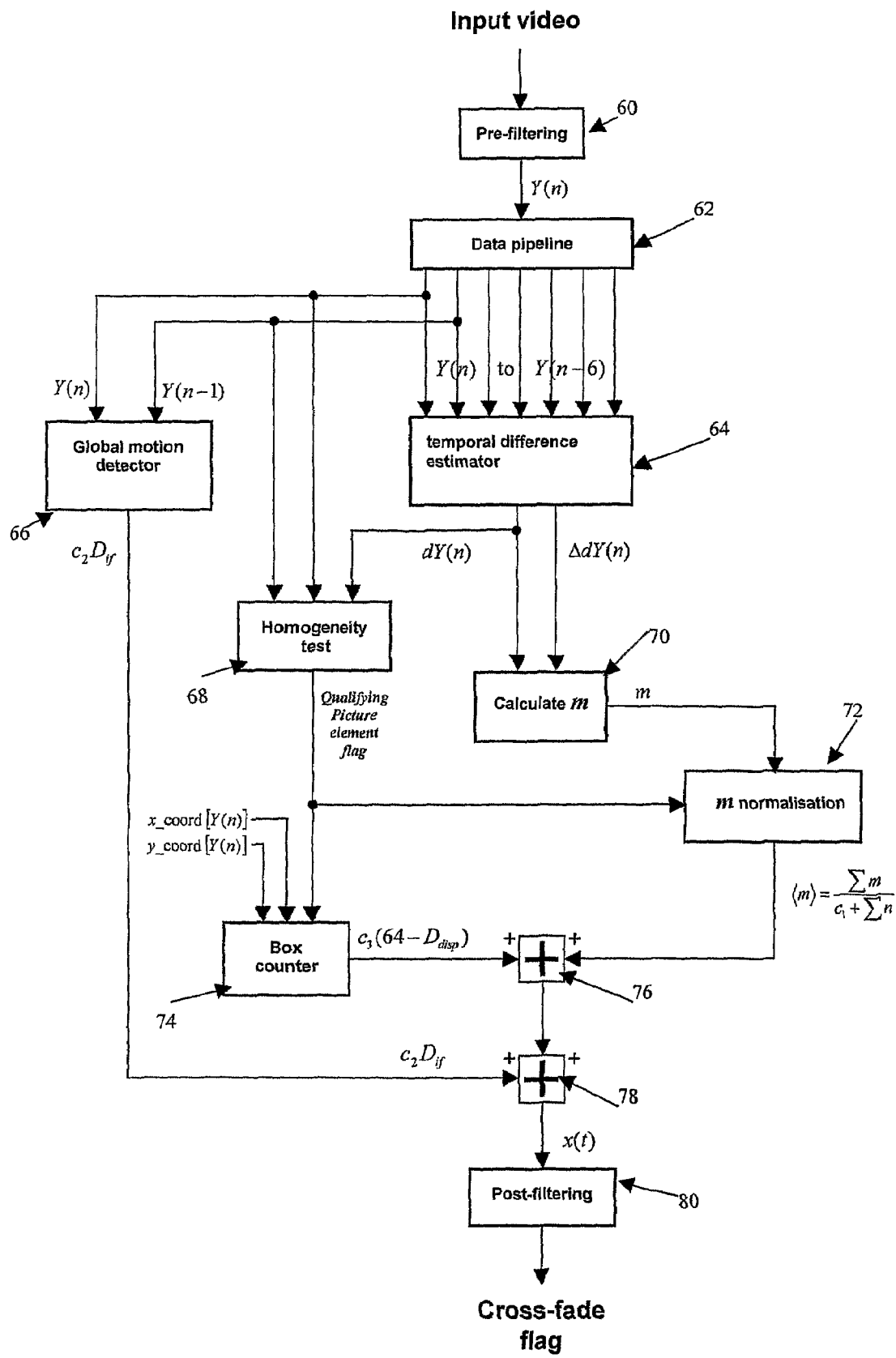
FIG. 6 is an overview of an exemplary functional block diagram implementing the method shown in FIG. 4.

The method described above with reference to FIG. 4 can be implemented using apparatus implementing the functional block diagram shown in FIGS. 6-15. FIG. 6 is an overview of the functional block diagram, while FIGS. 7-15 provide more detail of an exemplary functional implementation of the method described above with reference to FIG. 4.

Firstly, in FIG. 6 input images are filtered in the pre-filtering block 60 before being passed to a data pipeline block 62. The data pipeline block 62 forms a series of delayed output images Y(n) to Y(n−6) that are passed to a temporal difference estimator block 64. In addition the current image Y(n) and the preceding image Y(n−1) are passed to a global motion detector block 66 and to a homogeneity test block 68. The global motion detector block 66 produces a global motion factor $c_2 D_{if}$.

The temporal difference estimator block 64 determines the temporal picture information gradient dY(n) associated with picture elements in the current image and the rate of change of temporal picture information gradient ΔdY(n) associated with the picture elements in the current image, and passes these to block 70 for determining ratio m. Ratio m determined by block 70 is passed to normalisation block 72.

In addition, the temporal picture information gradient dY(n) is also passed to homogeneity test block 68. The homogeneity test block 68 determines a qualifying picture element flag for each picture element and passes the qualifying picture element flag to the normalisation block 72 and to a box counter block 74.

The normalisation block 72 determines a normalised value of $\Sigma_m$ and passes the normalised value of $\Sigma_m$ to an adder 76. A dispersion factor $c_3(64-D_{disp})$ determined by the box counter block 74 is also passed to the adder 76 and combined with the normalised value of m. The combined value is passed to a further adder 78 and combined therein with the global motion factor $c_2D_{if}$ generated by the global motion detector block 66, as indicated above, to form a cross-fade measure x(t).

The cross-fade measure x(t) formed in adder 78 is passed to a further filtering block 80 to generate a cross-fade flag.

It will be noted by a skilled person that the pre-filtering block 60, the data pipeline block 62, temporal difference estimator block 64, homogeneity test block 68 and the block 70 for determining ratio m all operate (i.e. output results) at the picture element processing rate. In contrast, the global motion detector block 66, normalisation block 72, the box counter block 74, adder 76, adder 78, and post-filtering block 80 operate (i.e. output results) at the image (field or frame) rate.

Figure 7:
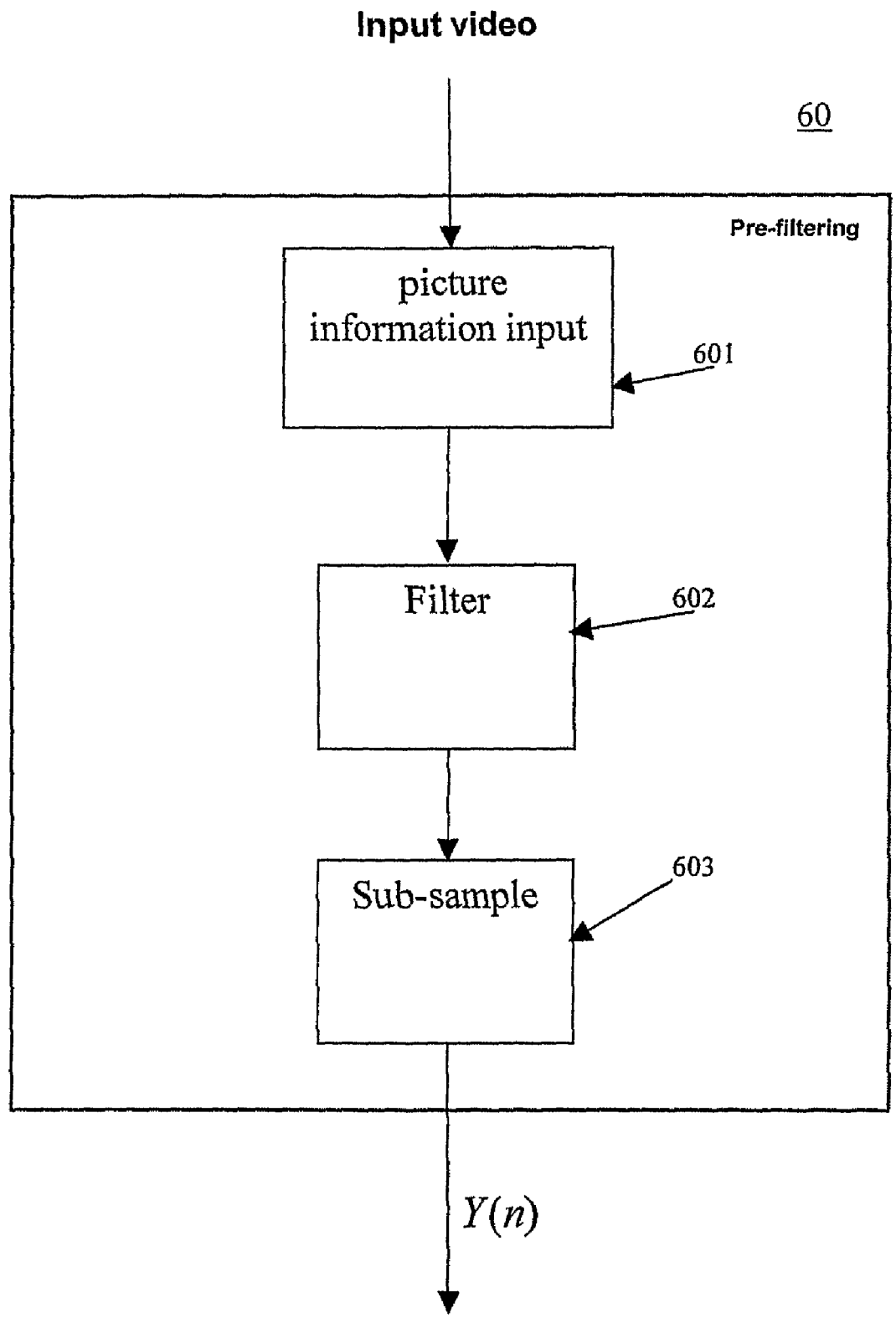
FIG. 7 is a functional block diagram of the exemplary pre-filtering block shown in FIG. 6.

Turning now to FIG. 7, an exemplary pre-filtering block 60 has a picture information input block 601, to receive the input video signal. The picture information input block is, in turn, coupled to a low pass filter block 602 and to a sub-sampling block 603 to generate picture information for sub-sampled picture elements of the current image Y(n). In alternative embodiments, either the low pass filter block 602 and/or the sub-sampling block 603 may be omitted.

Figure 8:
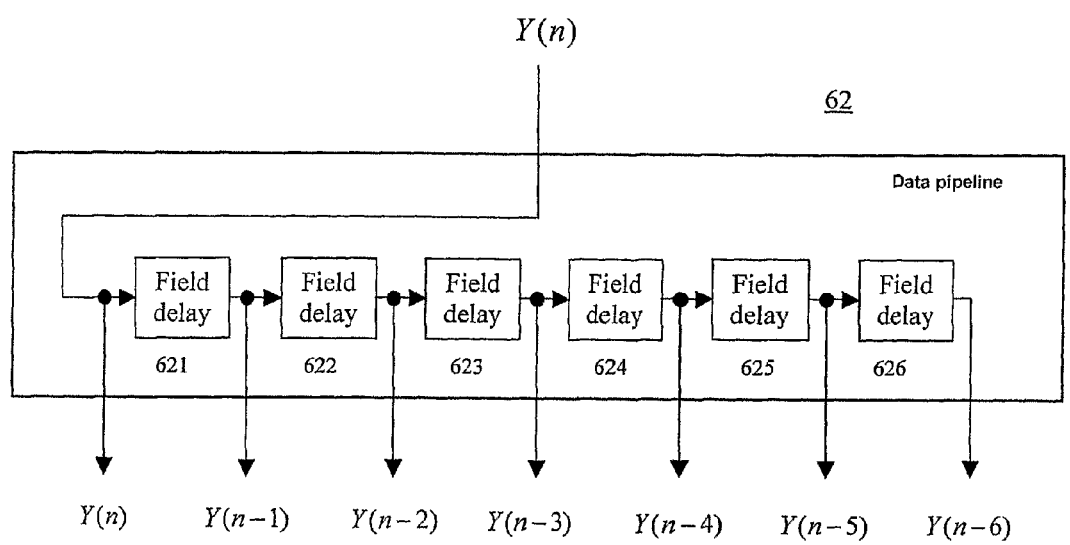
FIG. 8 is a functional block diagram of the exemplary data pipeline block shown in FIG. 6.

FIG. 8 is a functional block diagram of an exemplary data pipeline block 62. Data pipeline block 62 has a plurality of field delays 621-626 cascaded so as to provide picture information for sub-sampled picture elements for the current image and each of the six previous images Y(n–Y(n–6). As will be apparent to a skilled person the field delays 621-626 may be implemented in hardware or software.

Figure 9:
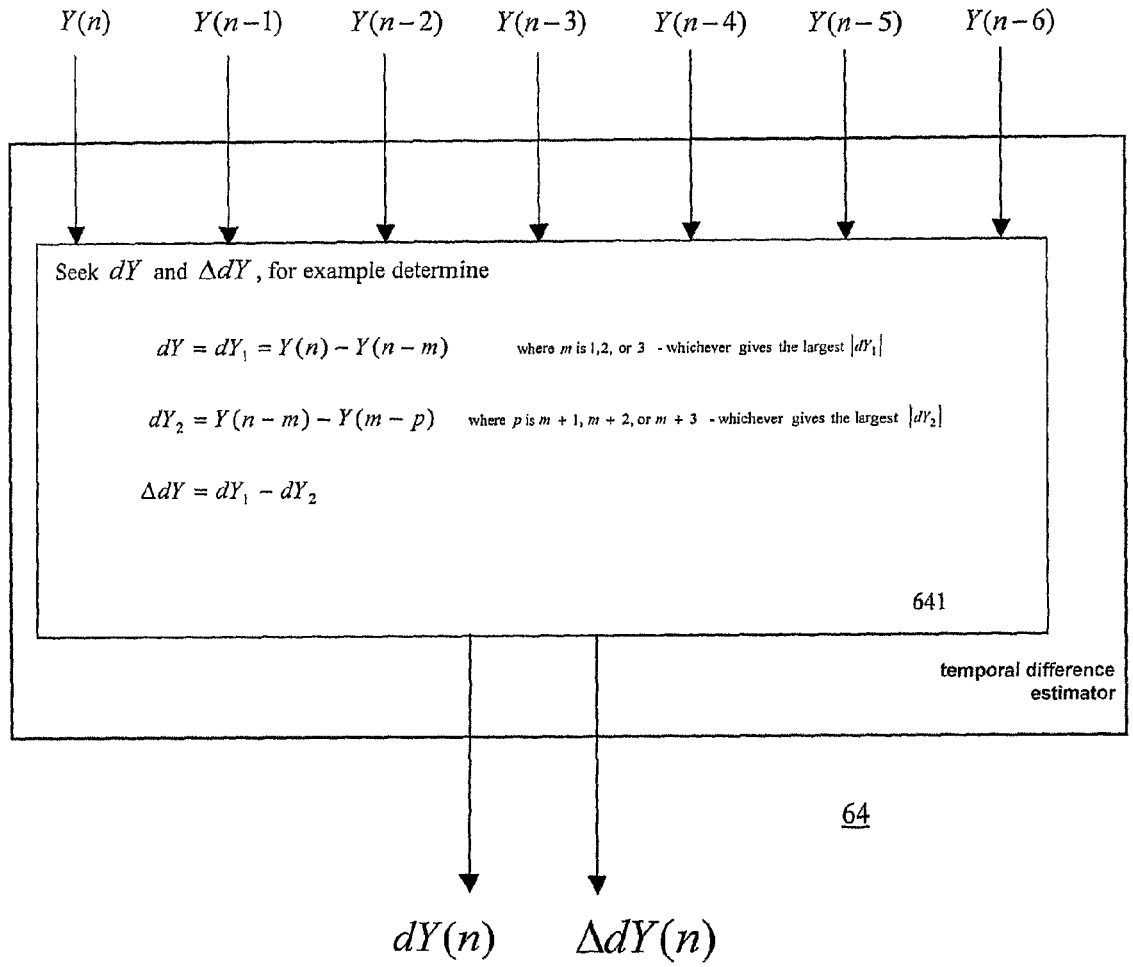
FIG. 9 is a functional block diagram of the exemplary temporal difference estimator block shown in FIG. 6.

FIG. 9 is a functional block diagram of an exemplary temporal difference estimator block 64. Temporal difference estimator 64 comprises an analyser 641 that receives the picture information for sub-sampled picture elements for the current image and each of the six previous images Y(n)–Y(n–6) and determines a picture information gradient dY(n) and a change of picture information gradient ΔdY(n) for each picture element of the current image. The analysis and determination may be done in using a number of different methods: the illustrated method corresponds to the preferred method discussed above with reference to FIG. 4.

As will be apparent to a skilled person, this function may be implemented in software where the picture information is stored in arrays and randomly accessed or may be implemented in hardware using a pipelined delay with appropriate taps to pick out possible combinations and conditional logic to identify the picture information gradient dY(n) and the change of picture information gradient ΔdY(n) for each picture element of the current image.

Figure 10:
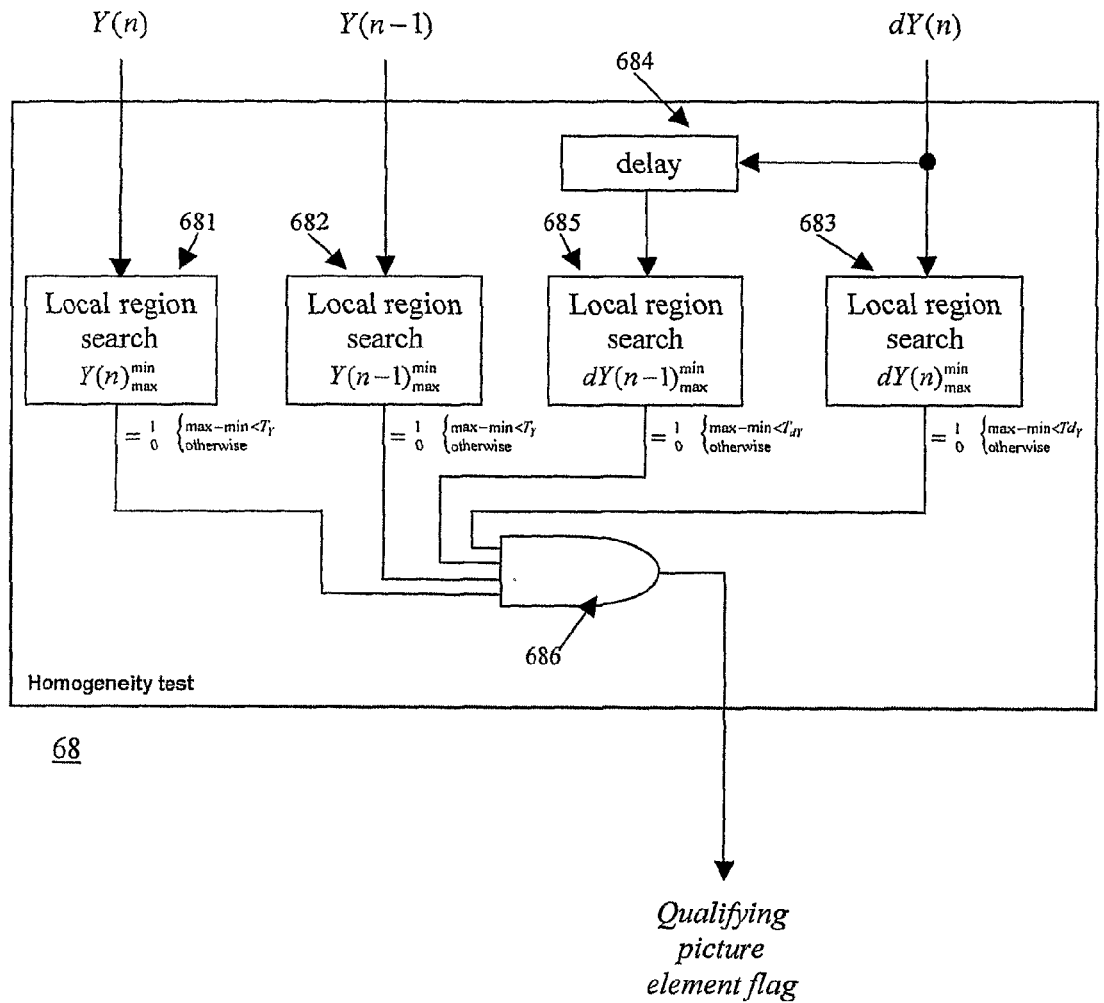
FIG. 10 is a functional block diagram of the exemplary homogeneity test block shown in FIG. 6.

FIG. 10 is a functional block diagram of an exemplary homogeneity test block 68. The exemplary homogeneity test block 68 receives picture information for the picture elements for the current image and the previous image, Y(n) and Y(n–1). In addition the exemplary homogeneity test block 68 receives picture information gradient dY(n) information. The picture information for the picture elements for the current image and the previous image, Y(n) and Y(n–1) and the picture information gradient dY(n) information are input to respective local region search blocks 681-683 respectively. In addition the picture information gradient dY(n) information is also delayed for one image period by delay 684 and the delayed picture information gradient dY(n) information is input to a further local region search block 685.

The local region search block 681 receives picture information for the picture elements for the current image. For each picture element the local region search block 681 determines the minimum and maximum picture information values of picture elements close to the picture elements. In one embodiment the local region search block 681 evaluates picture elements up to three picture elements away from current picture element. If the difference between the maximum and the minimum picture information value is less than a respective threshold, the local region search block 681 outputs a 1: otherwise the local region search block 681 outputs a zero. In other words the output of the local region search block indicates whether the picture information in a local area around the current picture element is sufficiently homogenous.

The local region search blocks 682 683 and 685 operate in an analogous manner on their respective inputs.

The outputs of local region search blocks 681-3 and 685 are input to an AND gate block 686. The output of the AND gate block 686 forms a qualifying picture element flag that is set when the outputs of all the local region search blocks 681-3 and 685 are 1.

In an alternative embodiment, local region search block 682 may be omitted and replaced with a delay block between the output of the local region search block 681 and the AND gate block 686. Similarly, local region search block 685 and delay block 684 may be omitted and replaced with a delay block between the output of the local region search block 683 and the AND gate block 686. In a yet further alternative embodiment, local region search blocks 682 and 685 and delay block 684 may be omitted entirely, leading to the determination of homogeneity being based only on information in the current image.

Figure 11:
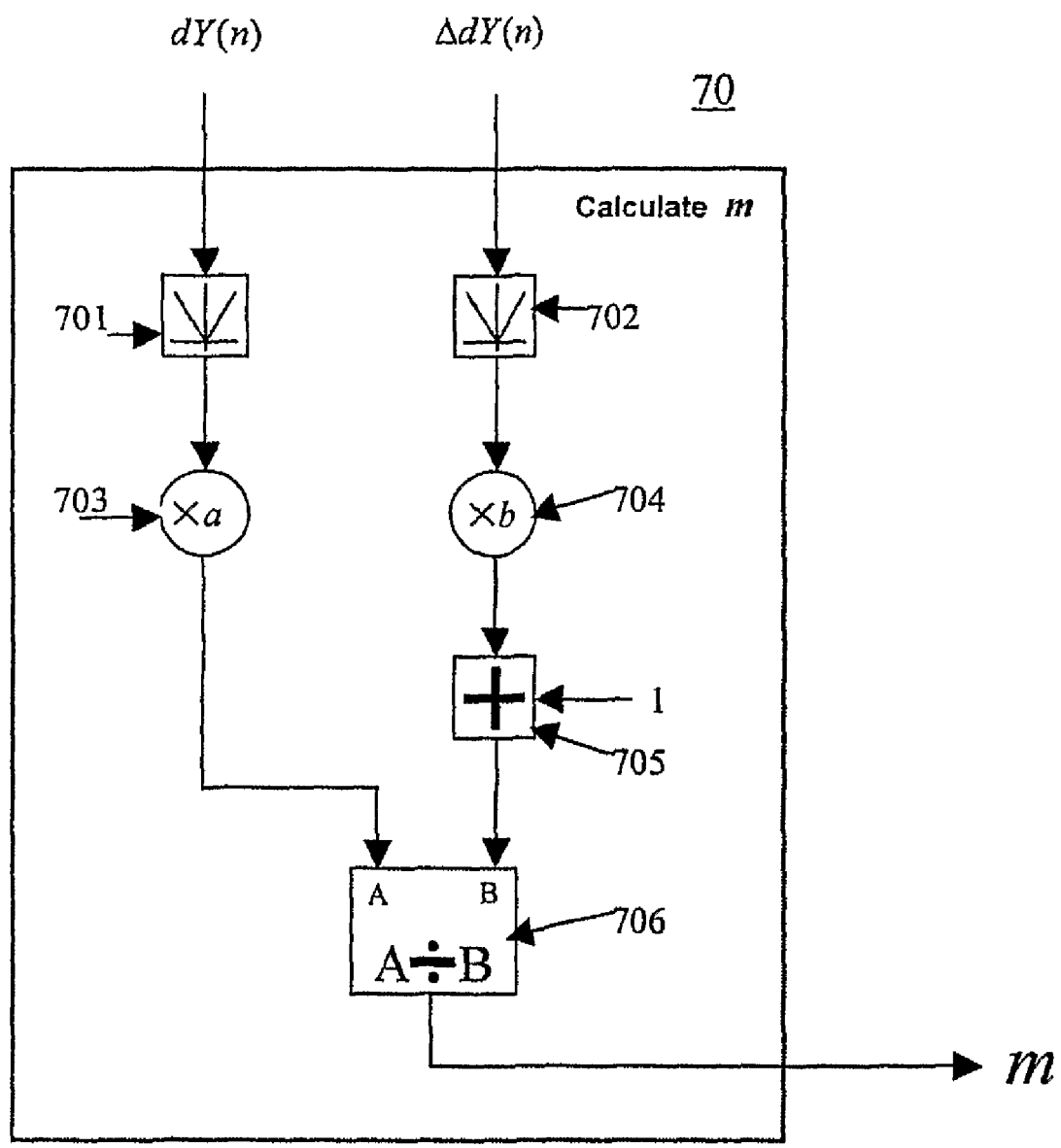
FIG. 11 is a functional block diagram of the exemplary block 70 for determining ratio m shown in FIG. 6.

FIG. 11 is a functional block diagram of an exemplary block 70 for determining ratio m. For each picture element of the current image the ratio m is determined by rectifying the received picture information gradient dY(n) and the change of picture information gradient ΔdY(n) for the picture element in rectifier blocks 701 and 702. The rectified picture information gradient dY(n) element from rectifier block 701 and rectified change of picture information gradient ΔdY(n) for the picture element from rectifier block 702 are multiplied by constants in respective multipliers 703 and 704. A small constant, such as 1 is added to the output from multiplier 704 in adder 705, and the output of adder 705 and the output of multiplier 703 are input to divider 706. Divider 706 divides the output of multiplier 703 by the output of adder 705 and outputs the ratio m.

Figure 12:
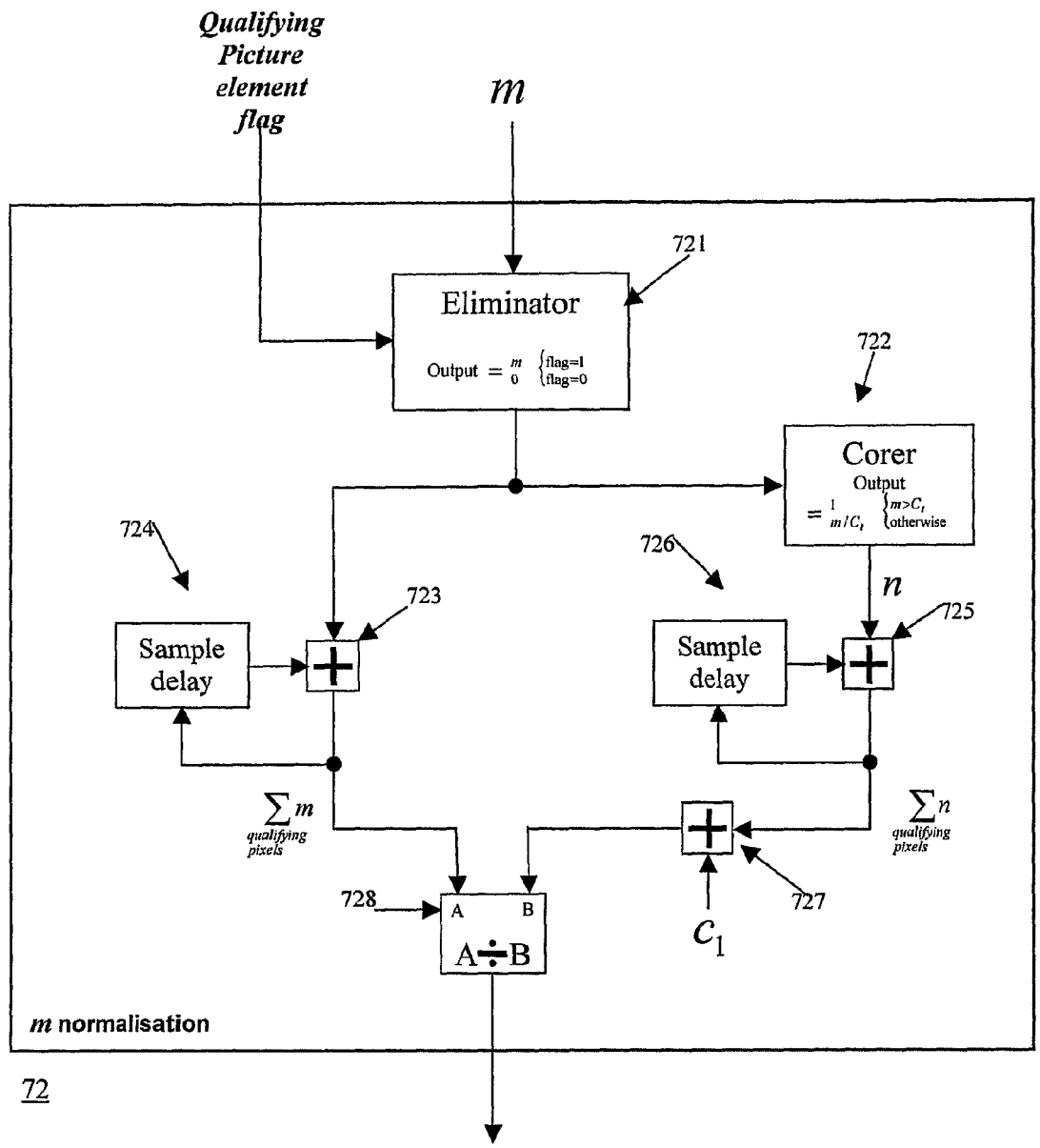
FIG. 12 is a functional block diagram of the exemplary normalisation block shown in FIG. 6.

FIG. 12 is a functional block diagram of an exemplary normalisation block 72 that determines a normalised value of m. An eliminator block 721 receives the ratio m and a qualifying picture element flag for each picture element and outputs that value of m if the picture element is a qualifying picture element, and outputs a value of zero if the picture element is not a qualifying picture element. The output of the eliminator block 721 is passed to a corer block 722 and to an adder block 723. The adder block 723 adds the input received from the eliminator block to the output of adder block 723 delayed by a one sample delay in delay block 724, over the image, to generate a cumulative value of m for all qualifying picture elements in an image. The corer block 722 outputs a value of 1 if m is greater than a constant $c_1$, and a value of if $m/c_1$ if m is less than a constant $c_1$. The output of the corer block 722 is passed to an adder block 725, The adder block 725 adds the input received from the corer block 722 to the output of the adder block 725 delayed by a one sample delay in delay block 726, over the image, to form a cumulative value for the number of pixels n.

Figure 13:
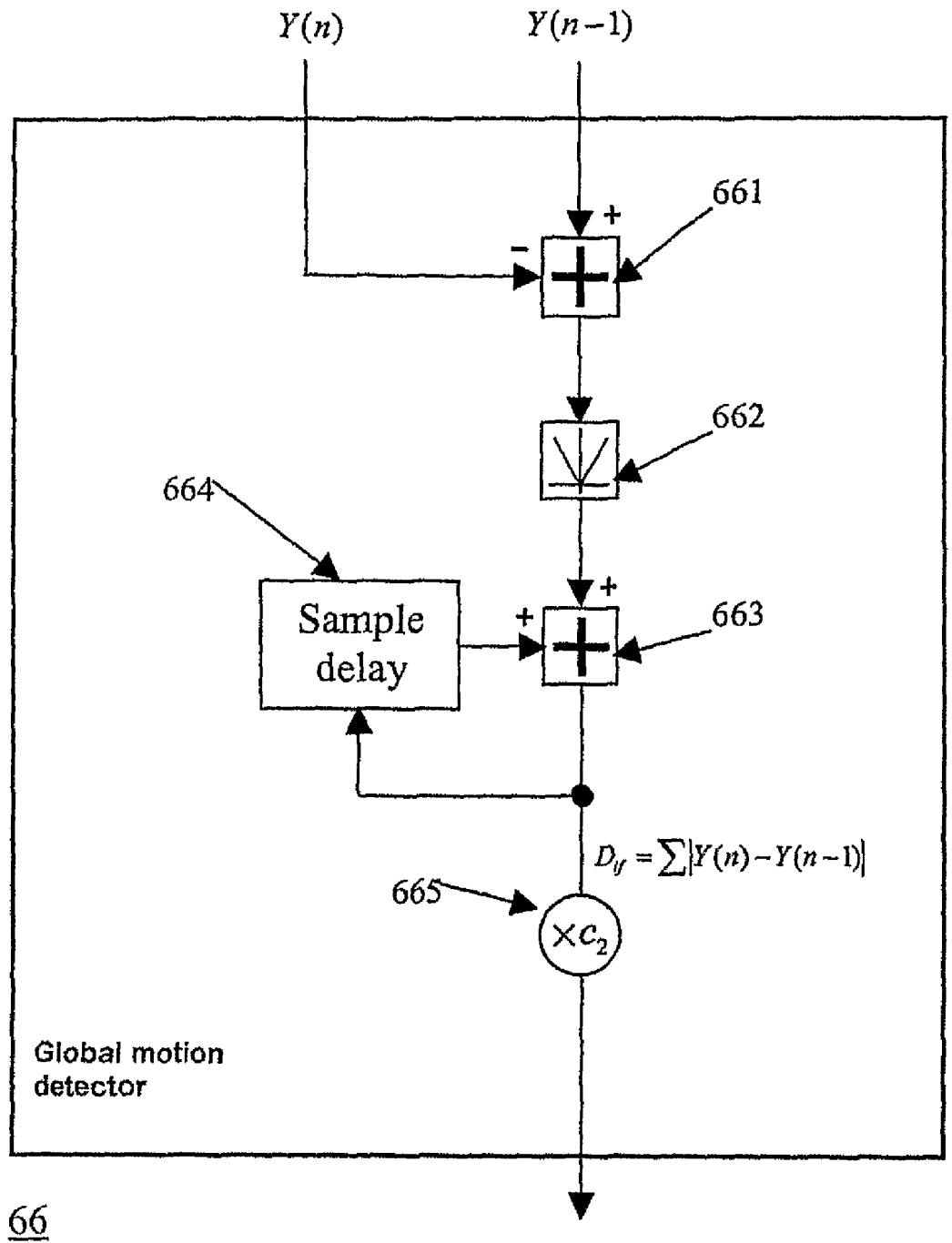
FIG. 13 is a functional block diagram of the exemplary global motion detector block shown in FIG. 6.

FIG. 13 is a functional block diagram of an exemplary global motion detector block 66. Picture information for sub-sampled picture elements of the current image Y(n) and picture information for sub-sampled picture elements of the previous image Y(n−1) are input to a subtractor block 661 to find a difference value. The difference values are rectified in rectifier 662 and accumulated over the image using adder block 663 and a delay block 664. The resulting cumulative difference value from adder block 663 is multiplied by a constant $c_2$ in multiplier block 665 to form the global motion factor $C_2 D_{if}$.

Figure 14:
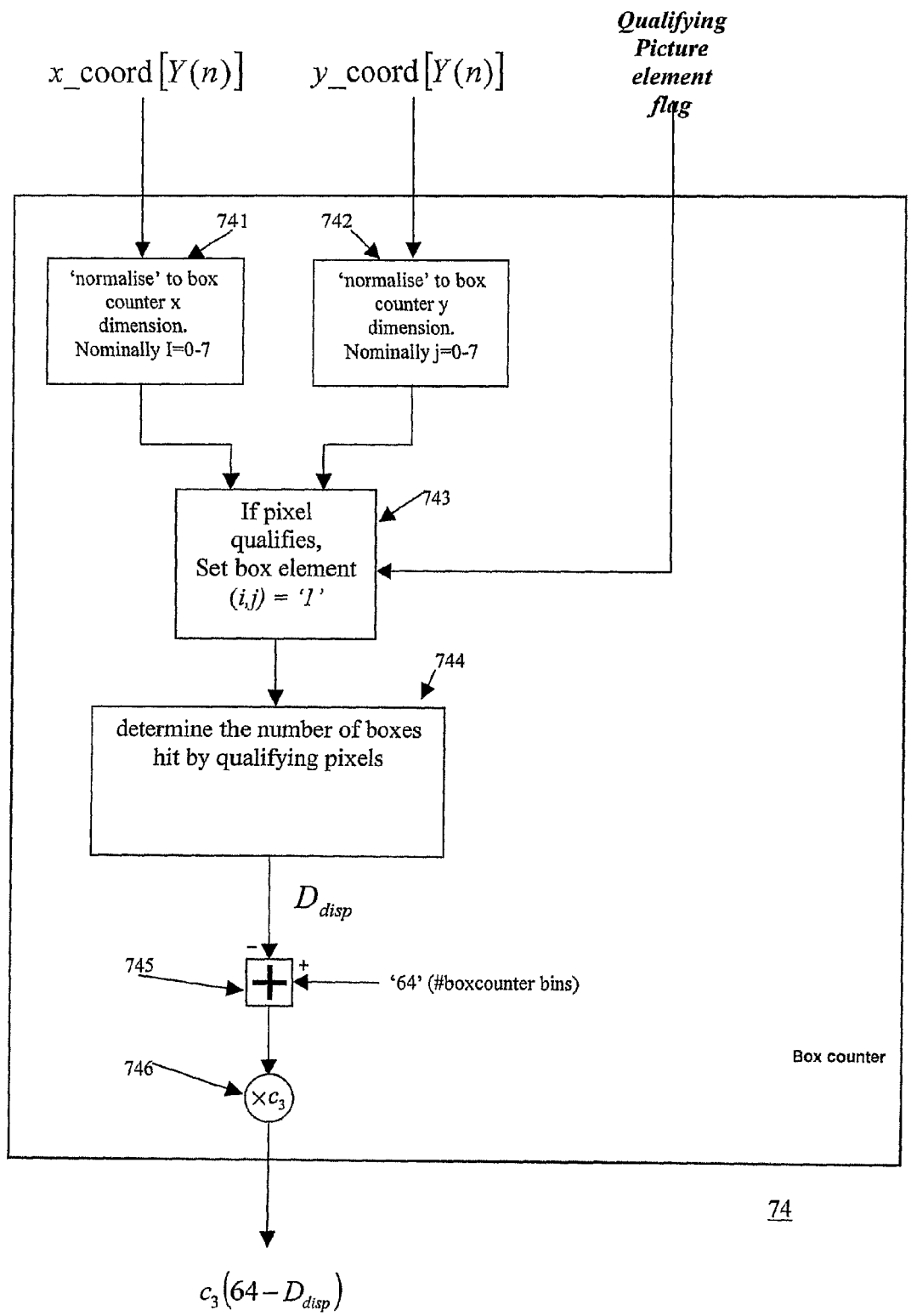
FIG. 14 is a functional block diagram of the exemplary box counter block shown in FIG. 6.

FIG. 14 is a functional block diagram of an exemplary box counter block 74. The box counter block 74 receives information of the position of a picture element on a picture element by picture element basis. In the illustrative embodiment the box counter block 74 receives information of the position of a picture element by means of x- and y-co-ordinates. The picture element is allocated to one of 8 columns over the image area by normalising the input x-coordinate information in normalisation block 741. The picture element is also allocated to one of 8 rows over the image area by normalising the input y-coordinate information in normalisation block 742. The resulting column and row information is applied to an evaluation block 743.

The evaluation block 743 also receives a qualifying picture element flag and sets a box element flag for a box element (i,j) if the current picture element is a qualifying picture element. After all the picture elements for an image have been evaluated, block 744 determines the number of boxes having at least one qualifying picture element, i.e. the number of set box element flags. This output is subtracted from the total number of boxes, 64 in this case, in subtractor block 745 and multiplied by a constant $C_3$ in multiplier block 746 to form the dispersion factor $C_3 (64-D_{disp})$.

Figure 15:
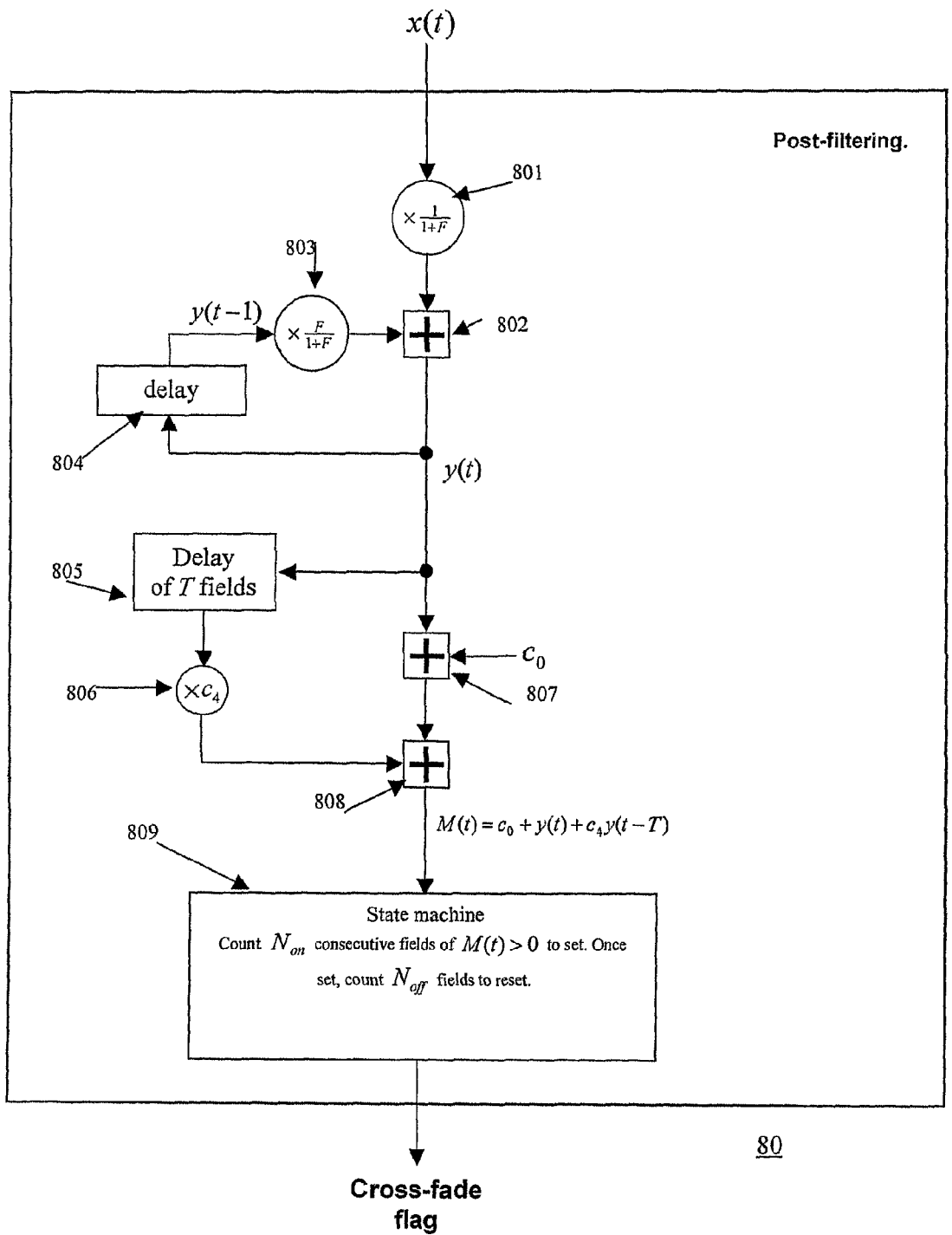
FIG. 15 is a functional block diagram of the exemplary post-filtering block shown in FIG. 6.

FIG. 15 is a functional block diagram of an exemplary post-filtering block 80. The cross-fade measure x(t) is initially multiplied by a constant $$\frac{1}{1+F}$$

in multiplier block 801. The output of the multiplier block 801 is summed in adder block 802 with the output of adder block 802 that has been delayed in an image delay 804 and multiplied by a constant $$\frac{F}{1+F}.$$

The output of the adder block 802 is delayed by a delay block 805 for T images, and multiplied by constant $C_4$ in multiplier block 806. The output of the adder block 802 is also multiplied by constant $c_0$ in multiplier block 807 before being combined with the output from multiplier 806 to form a post-filtered cross-fade measure M(t). Finally M(t) is input to a state machine 809 to form a cross-fade flag.

Clearly, as will be apparent to a skilled person the functional block diagrams in FIGS. 6-15 may be implemented in a number of ways. In particular, the described functions may be implemented in hardware or in software.

The functional block diagrams in FIGS. 6-15 illustrate an exemplary embodiment only, and the invention is not limited to the described implementation. In addition, not all of the functions set out in FIGS. 6-15 are required in generating the cross-fade measure, as discussed above with reference to method set out in FIG. 4.

In the above description the corresponding picture elements in each image used to establish the picture information gradients have been taken to be the exactly equivalently positioned picture elements in the images. However, in other embodiments motion compensation may be used and the picture elements used to establish picture information gradients may be motion-compensated corresponding picture elements.

The method and apparatus described above can provide a measure of likelihood of a cross-fade in a single pass. In addition the method described above can be accomplished in real-time or close to real-time. In addition the cross-fade detection results are comparable with, or better than, the results achieved by the prior art methods.

The invention claimed is:

1. A method of image analysis of an image in a sequence of images to determine a cross-fade measure, comprising the steps of:
   for a plurality of picture information picture elements representing the image, determining first and second temporal picture information gradients associated with the picture element and comparing the first and second temporal picture information gradients associated with the picture element to determine whether the picture information gradient is substantially uniform;
   wherein the first temporal picture information gradient is determined between a current image and a second image of the sequence of images; and
   wherein, for each picture element, the second image is selected as the image within a range of candidate second images that has the maximum difference between the picture information of the picture element of said current image and the corresponding picture element of the candidate second image.

2. The method as claimed in claim 1 where the difference in picture information is determined between motion-compensated corresponding picture elements.

3. The method as claimed in claim 1 wherein the second temporal picture information gradient is determined between said second image and a third image of the sequence.

4. The method as claimed in claim 3 wherein, for each picture element, the third image is selected as the image within a range of candidate third images that has the maximum difference between the picture information of the picture element of said second image and the corresponding picture element of the candidate third image.

5. The method as claimed in claim 1 wherein first and second temporal picture information gradients associated with the picture element are compared by taking the difference therebetween.

6. The method of claim 1 wherein a temporal picture information transition is considered to be substantially uniform when the difference between first and second temporal picture information gradients associated with the picture element is below a threshold.

7. The method as claimed in claim 1 further comprising the step of selecting qualifying picture elements, wherein only qualifying picture elements are used in determining a cross-fade measure.

8. The method of image analysis as claimed in claim 7 wherein the step of selecting qualifying picture elements comprises the step of selecting candidate picture elements located in image regions having substantially homogenous picture information as qualifying picture elements.

9. The method of image analysis as claimed in claim 7 wherein the step of selecting qualifying picture elements comprises the step of selecting candidate picture elements located in image regions having substantially homogenous picture information gradients as qualifying picture elements.

10. The method as claimed in claim 7 wherein the determination of the cross-fade measure is also dependent on the number of qualifying picture elements identified in the image.

11. The method of image analysis as claimed in claim 7 wherein the determination of the cross-fade measure is also dependent on how dispersed the qualifying picture elements are throughout the image.

12. The method as claimed in claim 1 wherein the determination of the cross-fade measure is also dependent on the magnitudes of the temporal picture information transitions associated with picture elements.

13. The method of image analysis as claimed in claim 1 further comprising the initial step, for each image of the sequence of images, of filtering the picture information of the image to generate picture information picture elements.

14. The method as claimed in claim 1 wherein the picture information is luminance information.

15. The method as claimed in claim 1 further comprising: establishing a cross-fade indication when the cross-fade measure determined in respect of at least two sequentially considered images indicates that a cross-fade is likely.

16. The method as claimed in claim 1 further comprising metadata generation from the cross-fade measure.

17. A non-transitory program carrier carrying computer-readable instructions implementing the method of image analysis of any of an image in a sequence of images to determine a cross-fade measure, comprising the steps of:
  for a plurality of picture information picture elements representing the image, determining first and second temporal picture information gradients associated with the picture element and comparing the first and second temporal picture information gradients associated with the picture element to determine whether the picture information gradient is substantially uniform;
  wherein the first temporal picture information gradient is determined between a current image and a second image of the sequence of images; and
  wherein, for each picture element the second image is selected as the image within a range of candidate second images that has the maximum difference between the picture information of the picture element of said current image and the corresponding picture element of the candidate second image.

* * * * *